United States Patent
Shin (10) Patent No.: US 10,041,521 B2
(45) Date of Patent: Aug. 7, 2018

(54) ASSEMBLY-TYPE FURNITURE EQUIPPED WITH PRESS-TYPE BONDING MEMBER

(76) Inventor: Dong Hyun Shin, Seoul (KR)

(*) Notice: Subject to any disclaimer, the term of this patent is extended or adjusted under 35 U.S.C. 154(b) by 888 days.

(21) Appl. No.: 13/823,989

(22) PCT Filed: Sep. 15, 2011

(86) PCT No.: PCT/KR2011/006792
§ 371 (c)(1),
(2), (4) Date: Mar. 15, 2013

(87) PCT Pub. No.: WO2012/036471
PCT Pub. Date: Mar. 22, 2012

(65) Prior Publication Data
US 2013/0170905 A1    Jul. 4, 2013

(30) Foreign Application Priority Data

Sep. 16, 2010  (KR) .................. 10-2010-0090831

(51) Int. Cl.
*F16B 17/00* (2006.01)
*A47B 47/00* (2006.01)
*F16B 2/14* (2006.01)

(52) U.S. Cl.
CPC .......... *F16B 17/00* (2013.01); *A47B 47/0075* (2013.01); *F16B 2/14* (2013.01); *Y10T 403/7096* (2015.01)

(58) Field of Classification Search
CPC .. F16B 5/00; F16B 5/06; F16B 5/0607; F16B 5/0614; F16B 5/0004; F16B 5/0008; F16B 5/002; F16B 12/00; F16B 12/10; F16B 12/12; F16B 12/125; F16B 12/20; F16B 12/24; F16B 12/26; F16B 2012/103; A47B 2230/0085; A47B 2230/16; A47B 2230/0092; A47B 2230/0096

See application file for complete search history.

(56) References Cited

U.S. PATENT DOCUMENTS 3,338,189 A * 8/1967 Xavier ................. 108/183
4,950,508 A    8/1990 Cherouse et al.
6,132,129 A   10/2000 Frazier

FOREIGN PATENT DOCUMENTS

DE          2042915 A1 *  3/1972
JP          2000201744     7/2000
KR          200221037 Y1   4/2001

OTHER PUBLICATIONS

Machine Translation of DE2042915. Translation [online]. European Patent Office, 2016 [retrieved on Dec. 20, 2016]. Retrieved from the Internet: <URL:http://translationportal.epo.org/emtp/translate/?ACTION=description-retrieval&COUNTRY=DE&ENGINE=google&FORMAT=docdb&KIND=A1&LOCALE=en_EP&NUMBER=2042915&OPS=ops.epo.org/3.2&SRCLANG=de&TRGLANG=en>.*

* cited by examiner

*Primary Examiner* — Matthieu F Setliff
(74) *Attorney, Agent, or Firm* — STIP Law Group, LLC

(57) ABSTRACT

Assembly-type furniture for convenient assembly, and reduced manufacturing cost by enhancing the productivity is provided. To this end, the assembly-type furniture equipped with a press-type bonding member includes a second piece provided with a long groove for bonding on the periphery of at least one side thereof, a first piece that slides onto the long groove of the second piece, and a bonding member that is provided on the second piece in a position that pressurizes one side of the long groove when the one side of the first piece slides along the long groove of the second piece, and maintains the bonded state of the second piece and the first piece in the pressed state.

3 Claims, 9 Drawing Sheets

ASSEMBLY-TYPE FURNITURE EQUIPPED WITH PRESS-TYPE BONDING MEMBER

CROSS-REFERENCE TO RELATED APPLICATION

This is a US national phase of PCT patent Application No. PCT/KR2011/006792 having an International filing date of Sep. 15, 2011, which claims priority to Korean Patent Application No. 10-2010-0090831, filed on Sep. 16, 2010, the entireties of which are incorporated herein by reference.

TECHNICAL FIELD

The present invention relates to assembly type furniture, and in particular to assembly type furniture equipped with a press type bonding member which has features in that an assembling work is easy, and an engaged state becomes reliable with the aid of a simple structure.

BACKGROUND ART

In modern lives, various kinds of furniture such as wardrobe, closet, decoration furniture, bed, etc. are wide spread.

In recent years, various types of assembly type furniture are being produced for the sake of infants or kids.

The above mentioned assembly type furniture is generally configured for its size and height to be adjustable or its pieces to be disassembled and assembled for specific purposes.

The construction of conventional assembly type furniture will be briefly described with reference to the accompanying drawings.

Figure 1:
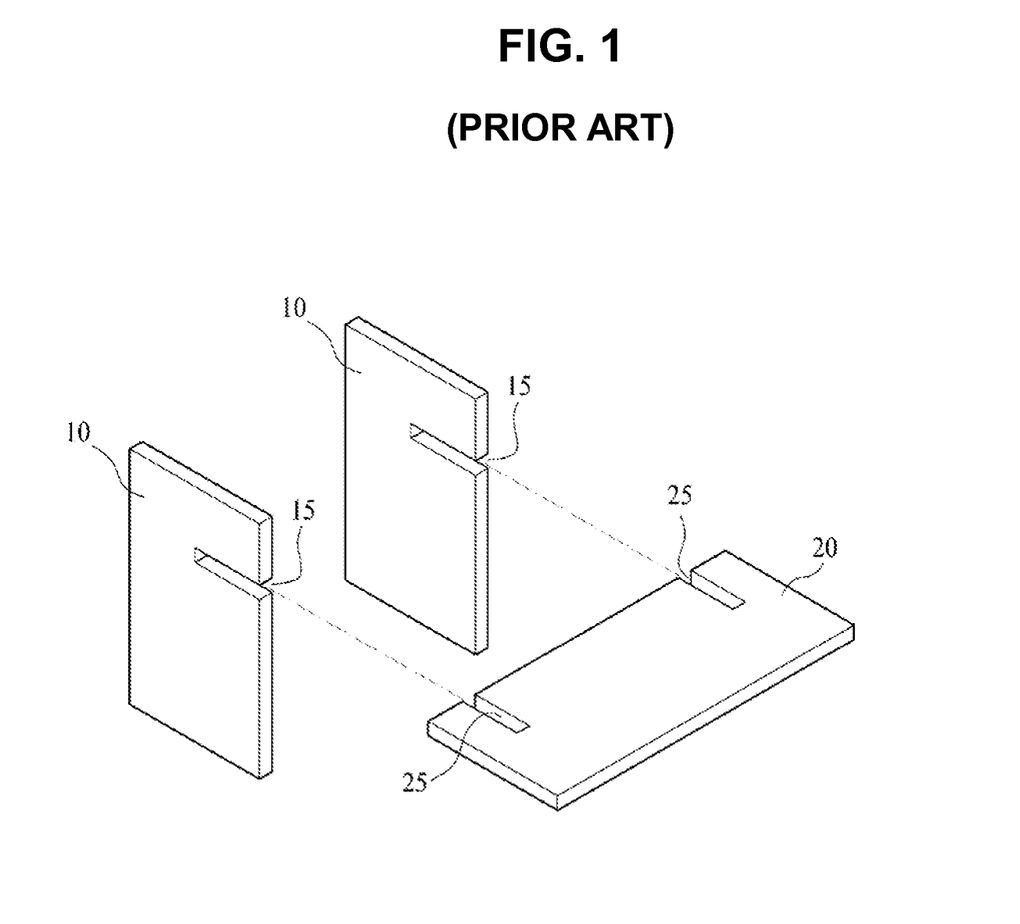
FIG. 1 is a disassembled perspective view illustrating a state that conventional assembly type furniture is engaged.
Figure 2:
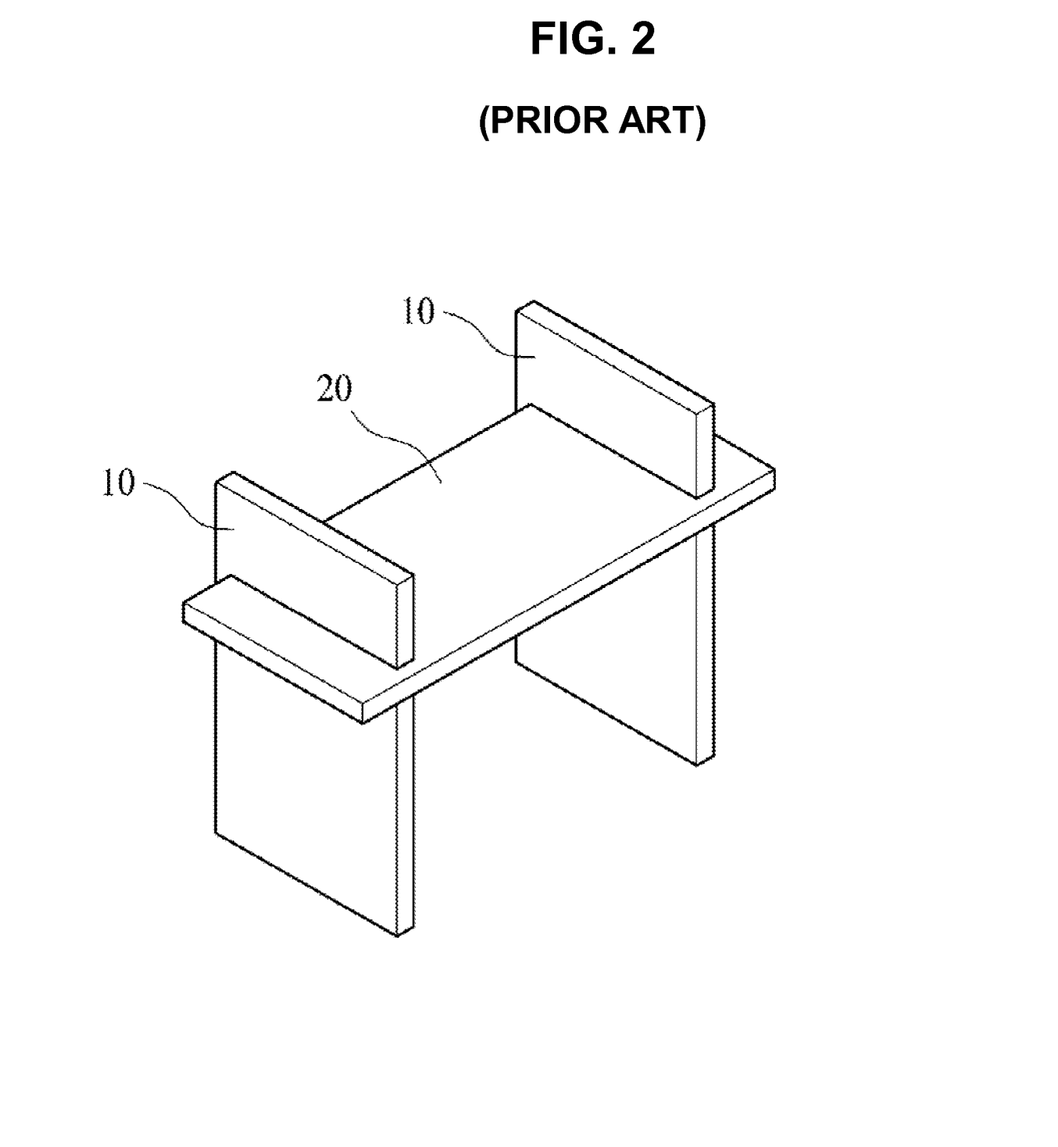
FIG. 2 is a perspective view illustrating a state that conventional assembly type furniture is engaged.

FIG. 1 is a disassembled perspective view illustrating a configuration that conventional assembly type furniture is engaged, and FIG. 2 is a perspective view illustrating a construction that conventional assembly type furniture is engaged.

As shown therein, the conventional assembly type furniture is configured in such a way that multiple pieces can be engaged or disengaged from each other and FIGS. 1 and 2 show an example of basic chair type furniture.

The multiple pieces may be formed of a member such as a synthetic resin or veneer plywood. As shown in FIG. 1, a first piece 10 is a leg member supporting a chair, and a second piece 20 is a sitting member in which a person can sit.

Here, the first piece 10 and the second piece 20 have long grooves 15 and 25 helping cross-engage the first piece 10 and the second piece 20.

The first and second pieces 10 and 20 are inserted in the long grooves 15 and 25.

In this case, in order for the engaged state to be maintained durably and stably, the long groove 25 of the second piece 20 and the long groove 15 of the first piece 10 are arranged to match the thicknesses of the corresponding pieces 10 and 20.

When engaging the pieces with the long grooves formed in each piece, it is hard to determine an accurate size of each long groove. When determining such a size in terms of a common wooden material, the long groove may become widened as time passes or may crack, so the engaged state may be loosened.

Figure 3:
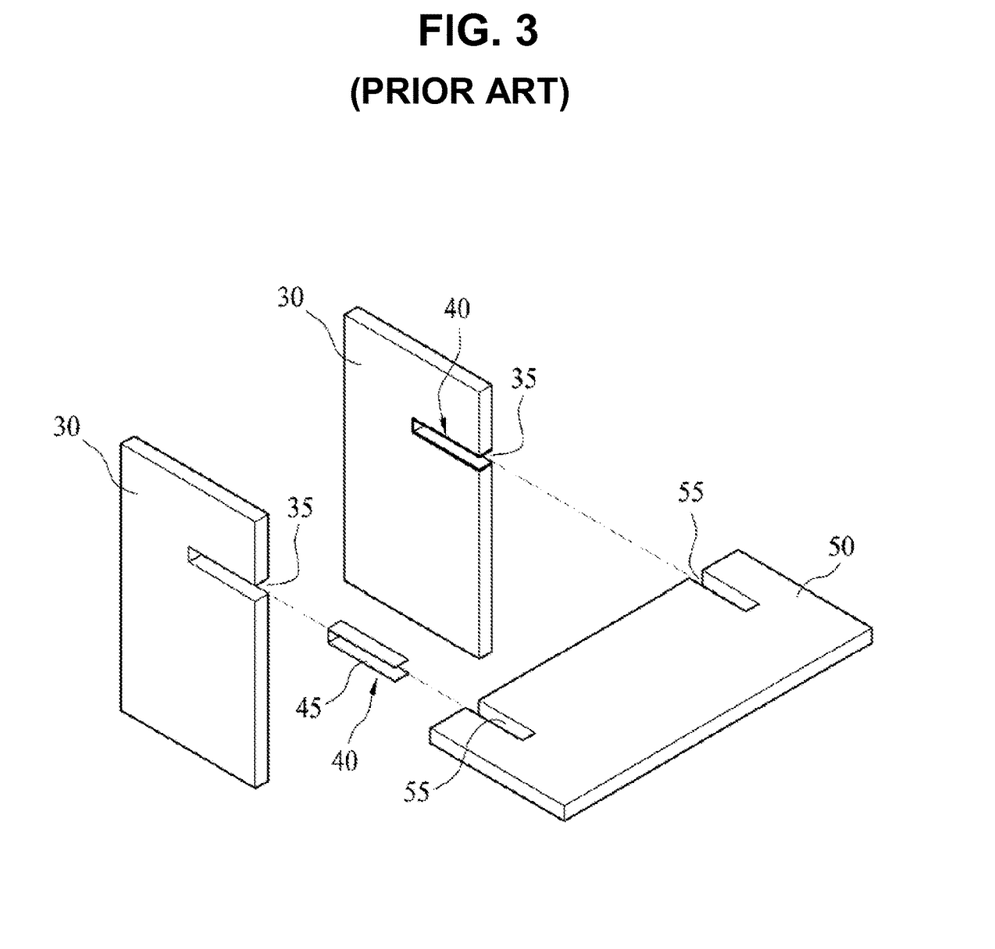
FIG. 3 is a disassembled perspective view illustrating a state that another type of conventional assembly type furniture is engaged.

In order to improve the above mentioned problems, as shown in FIG. 3, in the long groove 35 of the piece 30 of one side in the first and second pieces 30 and 50 with the long grooves 35 and 55 is provided a packing 40 made from a flexible member such as a silicon material and having an open groove 45 one side of which is open, so the first and second pieces 30 and 50 are engaged with the aid of the flexibility and compression of the packing 40, which construction is widely used; however in this case the manufacture costs a lot because the packing 40 should be made using an additional mould.

In particular, when the shapes of the long grooves formed in each piece are different for the sake of the packing 40, the packing 40 should be made in match with the shape of each long groove. In case of complicated assembly type furniture, multiple flexible members with different shapes are needed, so the manufacture costs a lot. The procedure of installing the flexible member in each long groove is very complicated.

DISCLOSURE OF INVENTION

Accordingly, the present invention is made to improve the above mentioned problems encountered in the conventional art and other problems. The objects to overcome the problems are as follows.

It is a first object of the present invention to provide assembly type furniture equipped with a press type bonding member which has features in that an engaging work of multiple pieces in assembly type furniture is easy.

It is a second object of the present invention to provide assembly type furniture equipped with a press type bonding member which has features in that the whole manufacture cost and time can be saved in the assembly type furniture.

To achieve the above objects, there is provided an assembly type furniture equipped with a press type bonding member, comprising a second piece which includes a second long groove for engagement at a circumference of at least one side; a first piece which is inserted in the second long groove of the second piece and slides along the second long groove; and a bonding member which is provided in the first piece at a position pressing one side of the second long groove when the first piece is inserted in along the second long groove of the second piece and slides for thereby maintaining an engaged state of the second piece and the first piece in a state that it is pressed between one side of each of the first piece and the second piece and one side of the second long groove.

Here, the first piece has a fixing groove, and the bonding member is fixedly inserted in the fixing groove with part of the bonding member exposing to the outside.

In addition, the first piece comprises a first long groove corresponding to the second long groove of the second piece, and the second long groove of the second piece and the first long groove of the first piece slide crossing to each other, so the second piece and the first piece are engaged.

In addition, the bonding member is inclined for the first piece to slide and insert in the second long groove of the second piece in easier way.

Meanwhile, there is provided an assembly type furniture equipped with a press type bonding member, comprising a main piece which includes a main long groove for engagement at a circumference of at least one side; an auxiliary piece which slides in the main long groove of the main piece; and a bonding member which is provided in the auxiliary piece at a position pressing one side of the main long groove when one side of the auxiliary piece slides along the main long groove of the main piece, by which to maintain an engaged state of the main piece and the auxiliary piece in a state that one side of the auxiliary piece and one side of the main long groove of the main piece are pressed, and the auxiliary piece comprises an auxiliary long groove corresponding to the main long groove of the main piece, and at the other side of the auxiliary long groove is provided a protrusion, and at both sides of the auxiliary long groove of the auxiliary piece is provided a long piece which comes to have the same height as that of the protrusion of the main piece after the auxiliary piece is engaged with the main piece, and there is further provided a third piece with a cross shaped groove which accommodates a crossed portion in which the protrusion and the long piece reside as the auxiliary piece and the main piece are engaged.

Here, the auxiliary piece comprises a fixing groove, and part of the bonding member is fixedly inserted in the fixing groove with part of the press bonding exposing to the outside.

In addition, the auxiliary piece comprises an auxiliary long groove corresponding to the main long groove of the main piece, and the main long groove of the main piece and the auxiliary long groove of the auxiliary piece slide crossing to each other, so the main piece and the auxiliary piece are engaged.

In addition, the bonding member is inclined for the auxiliary piece to slide and easily insert in the main long groove of the main piece.

Advantageous Effects

The effects of the assembly type furniture equipped with a press type bonding member according to the present invention will be described.

First, the assembly type furniture equipped with a press type bonding member according to the present invention has features in that the assembly of pieces can be finished by simply installing a bonding member in a fixing groove, so the manufacture procedure becomes simple, and the manufacture and assembly of the bonding member become easier.

Second, thanks to the simplification of the assembly procedure, the whole manufacture cost can be saved, and the workers' costs for installing the bonding member at the piece can be saved as well.

Third, the assembly type furniture equipped with a press type bonding member has features in that the same shapes of the bonding members are adapted around the long grooves between different shapes of pieces, so the workers' labors and manufacture costs can be saved.

Fourth, one side of the bonding member adapted to assembly type furniture equipped with a press type bonding member according to the present invention is slanted, a user can easily assemble the furniture during an actual assembling process.

BEST MODES FOR CARRYING OUT THE INVENTION

The preferred embodiments of the present invention will be described with reference to the accompanying drawings. In the course of the descriptions of the present invention, the same elements will be given the same names and reference numerals, and additive descriptions thereon will be described.

The assembly type furniture has features in that it provides various types of furniture as a plurality of predetermined pieces are combined with each other. A chair, a bed, a dresser, etc. can be formed as assembly type furniture. At this time, it is possible to provide an assembly of furniture formed of the same pieces depending on the assembly type of pieces, not only the furniture selected among the above mentioned kinds. Finally, the numbers and shapes of pieces may change depending on the selected furniture.

As an example of the present invention, the assembly type furniture of a chair type formed as flat board shaped pieces are combined will be described for the sake of better understanding in terms of shapes and descriptions.

First of all, the assembly type furniture with a press type bonding member according to an embodiment of the present invention will be described with reference to FIGS. 4 and 5.

Figure 4:
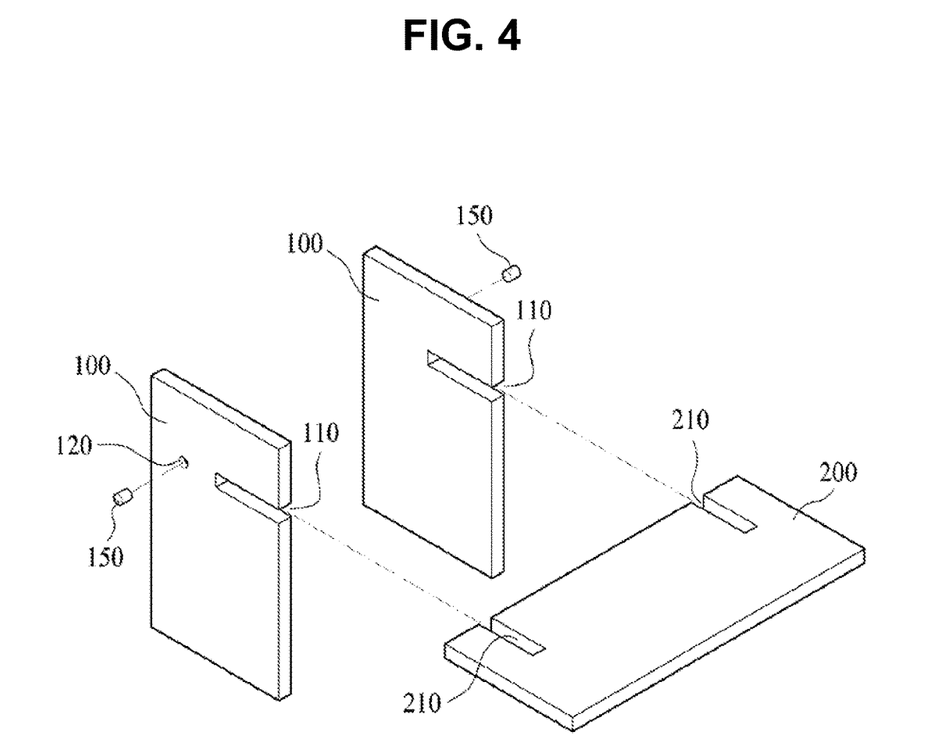
FIG. 4 is a disassembled perspective view illustrating a state that assembly type furniture according to an embodiment of the present invention is engaged.
Figure 5A:
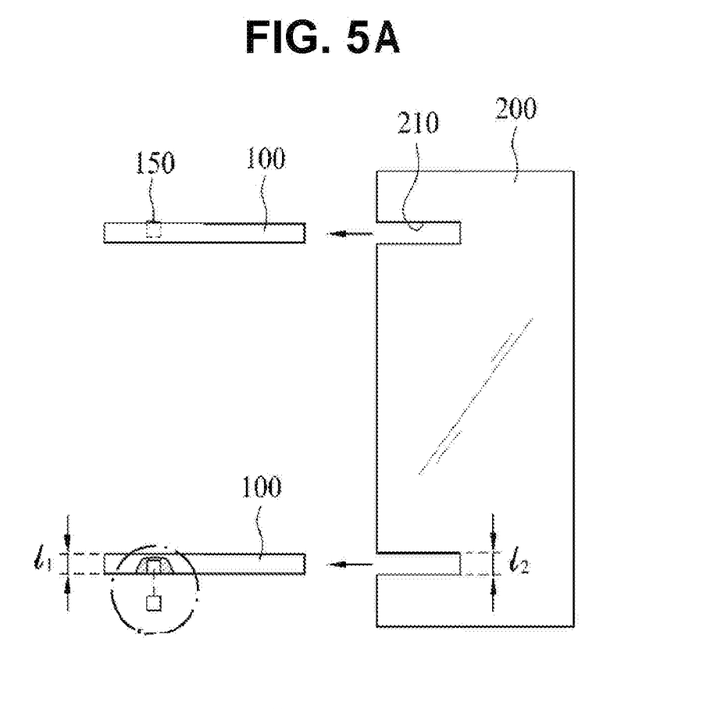
FIG. 5 is a disassembled plane view illustrating a state that assembly type furniture according to an embodiment of the present invention is engaged.
Figure 5B:
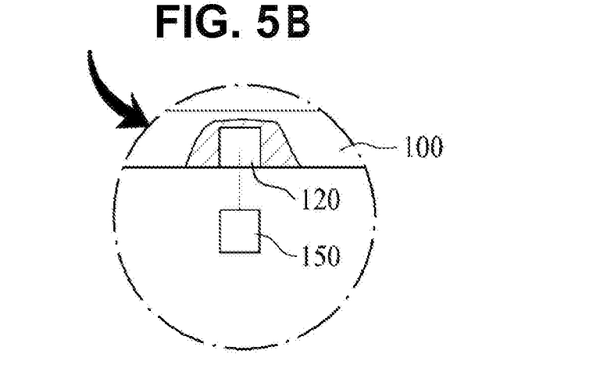

In the drawings, FIG. 4 is a disassembled perspective view illustrating a state that assembly type furniture according to an embodiment of the present invention is engaged, and FIG. 5 is a disassembled plane view illustrating a state that assembly type furniture according to an embodiment of the present invention is engaged.

As shown therein, the assembly type furniture equipped with a press type bonding member according to the present invention comprises a second piece 200 with a second long groove 210 formed along at least one circumference, and a first piece 100 which slides in the second long groove 210 of the second piece 200.

At this time, a press type bonding member 150 (hereinafter referred to as "press member") is provided in the first piece 100 at a position where at least one of the second long groove 210 provided in the second piece 200 is pressurized when one side of the first piece 100 is inserted along the second long groove 210 of the second piece 200 and slides, so the engaged state of the second piece 200 and the first piece 100 can be maintained.

As shown therein, the first piece 100 comprises a fixing groove 120, and the bonding member 150 is fixedly inserted in the fixing groove 120.

Here the bonding member 150 is made of an elastic member with flexibility like a rubber or silicon material. The compression member 150 may be engaged in the fixing groove 120 in a tight fitting way or may be fixed using a bonding liquid.

It is preferred that the assembly type furniture is manufactured by a tight fitting way because it is generally used by children for the sake of no toxicity. It is preferred that the size and shape of the assembly type furniture is large enough and is shaped to prevent a child from eating the same.

The first piece 100 comprises a first long groove 110 corresponding to the second long groove 210 of the second piece 200. The second long groove 210 of the second piece 200 and the first long groove 110 of the first piece 100 slide crossing to each other in order for the second piece 200 and the first piece 100 to engage with each other.

It is preferred that the width (L2) of the second long groove 210 of the second piece 200 is greater than the width (L1) of the first long groove 110 of the first piece 100 so as to achieve an easier insertion operation before the sliding begins. The bonding member 150 comes to press one inner side of the second long groove 210 of the second piece 200 to make part of the same expose from the fixing groove 120 to the extent that the first piece 100 and the second piece 200 are reliably engaged with each other maintaining a pressed state.

The operations of the assembly type furniture equipped with a press type bonding member according to an embodiment of the present invention will be described with reference to the accompanying drawings.

As shown in FIGS. 4 and 5, the first long groove 110 of the first piece 100 and the second long groove 210 of the second piece 200 are inserted in each other and are engaged. At this time, since the bonding member 150 remains exposed from the first piece 100 at a position in which at least one side of the second long groove 210 provided in the second piece 200 is pressed, the second piece 200 and the first piece 100 can remain engaged in a state that the bonding member 150 is pressed.

As not shown in the drawings, the bonding member 150 remains exposed to both sides, not one side, of the first piece 100, so both sides of the second long groove 210 of the second piece 200 can be pressed.

Figure 6A:
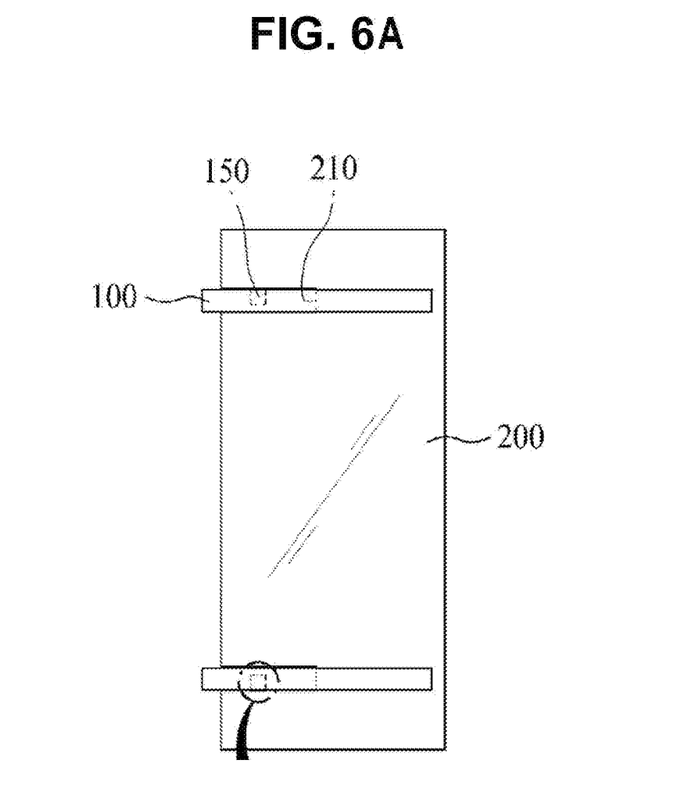
FIG. 6 is a plane view illustrating a state that assembly type furniture according to an embodiment of the present invention is engaged.
Figure 6B:
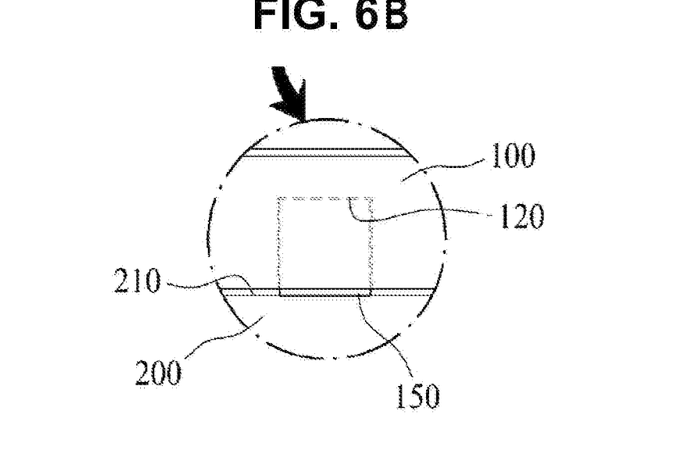
Figure 7:
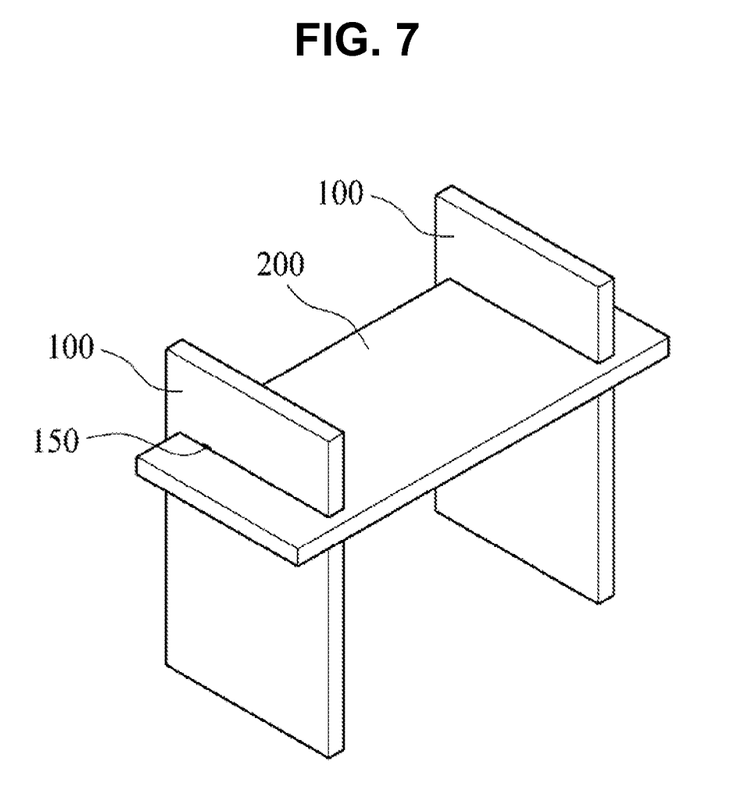
FIG. 7 is a perspective view illustrating assembly type furniture according to an embodiment of the present invention is engaged.

FIGS. 6 and 7 show a state that the first piece 100 and the second piece 200 are engaged by the bonding member 150 as described above.

Figure 8A:
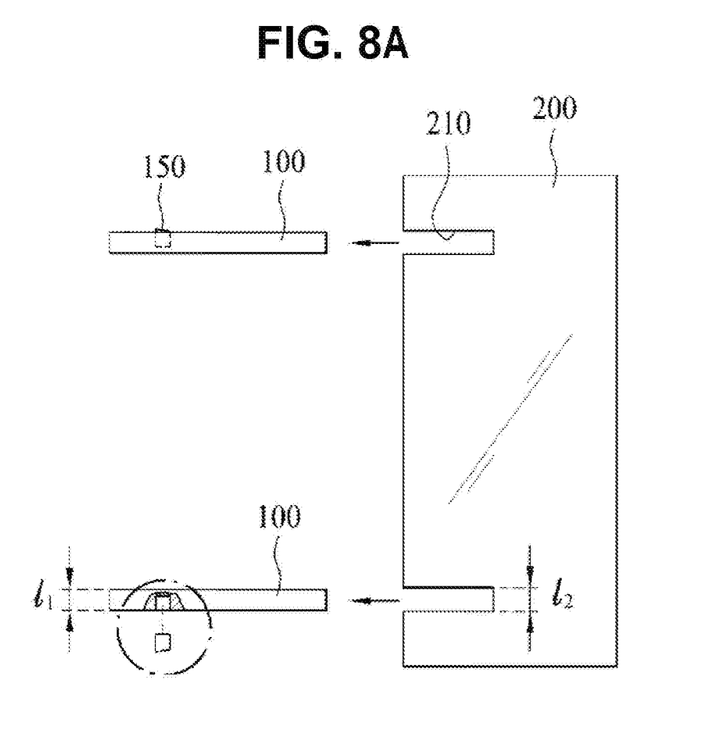
FIG. 8 is a disassembled plane view illustrating a state that assembly type furniture according to another embodiment of the present invention is engaged.
Figure 8B:
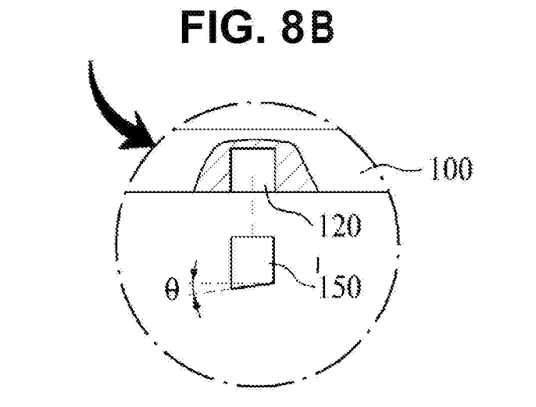

FIG. 8 is a disassembled plane view illustrating a state that assembly type furniture according to another embodiment of the present invention is engaged.

In the assembly type furniture according to another embodiment of the present invention, the bonding member 155 is slanted at a certain inclination angle (θ) so that the first piece 100 slides with respect to the second piece 200 and comes to insert in the second long groove 210 of the second piece 200.

In addition, since one side of the bonding member 155 is slanted, the insertion behavior by a user can be easily performed when the first piece 100 slides in the second long groove 210. When it is fully inserted and the bonding member 155 is pressed, the first and second pieces 100 and 200 are very hard to separate from each other unless a strong force is applied thereto.

Figure 9:
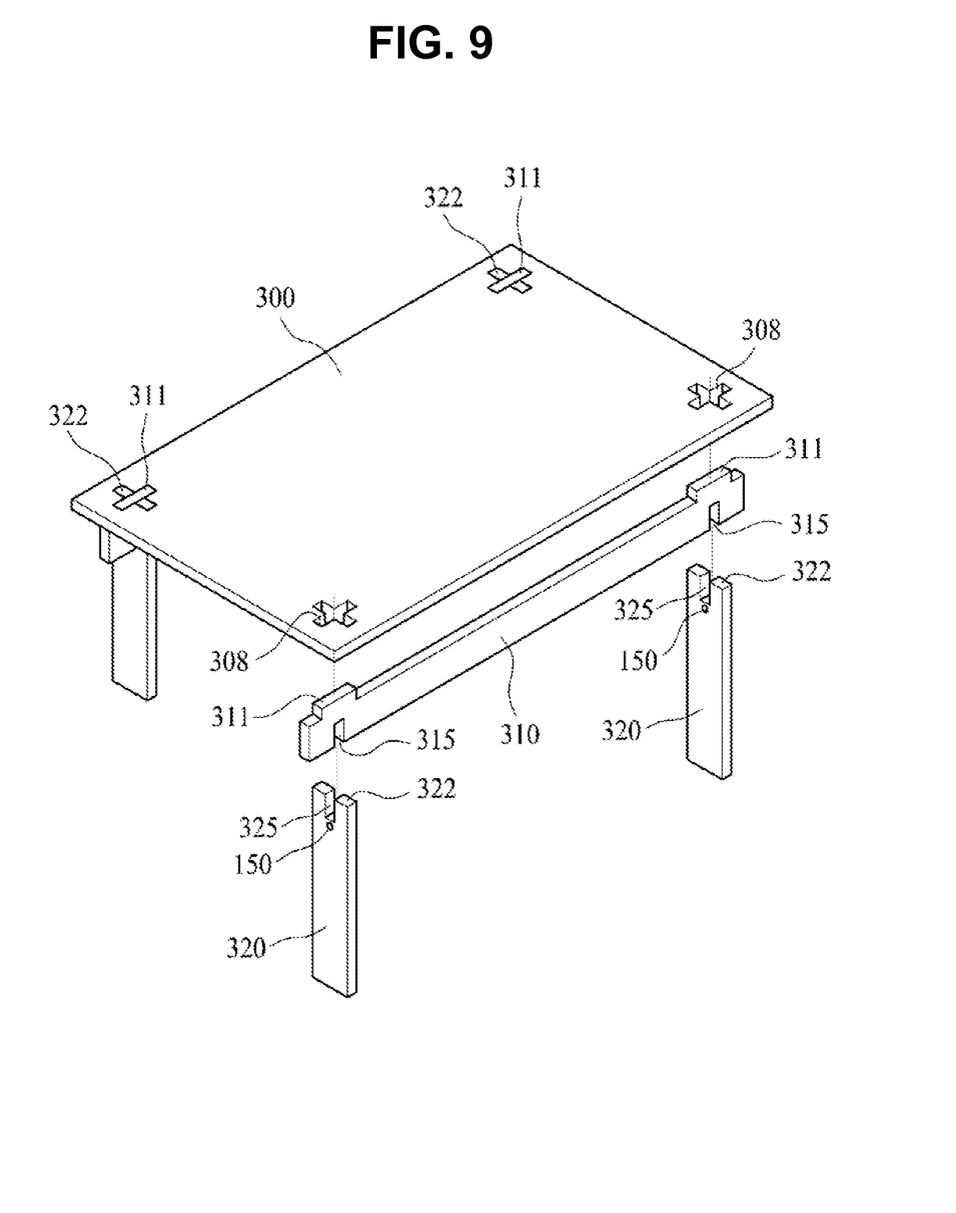
FIG. 9 is a disassembled plane view illustrating a state that assembly type furniture according to further another embodiment of the present invention is engaged.

FIG. 9 is a disassembled plane view illustrating a state that assembly type furniture with a press type bonding member according to further another embodiment of the present invention is engaged.

As shown therein, like the earlier described embodiments, the assembly type furniture according to further another embodiment of the present invention comprises a main piece 310 with a main long groove 315 for engagement formed at a circumference of at least one side for the sake of engagement, an auxiliary piece 320 siding in the main long groove 315 of the main piece 310, and bonding member which is provided in an auxiliary piece 320 at a position pressing one side of the main long groove 315 when one side of the auxiliary piece 320 slides along the main long groove 315 of the main piece 310, making sure that a pressed state is obtained between one side surface of the auxiliary piece 320 and one side of the main long groove 315 of the main piece 310, so that the engaged state of the main piece 310 and the auxiliary piece 320 can be maintained.

At this time, the auxiliary piece 320 comprises an auxiliary long groove 325 corresponding to the main long groove 315 of the main piece 310, and at the other side of the auxiliary long groove 325 of the auxiliary piece 320 is provided a protrusion 322. At both sides of the auxiliary long groove 325 is provided a long piece 311 which will have the same height as that of the protrusion 311 of the main piece 310 after the auxiliary piece 320 is engaged with the main piece 310.

There is further provided a third piece 2 with a cross shaped groove 308 which will receive the crossed portions in which the protrusion 311 and the long piece 322 are provided as the auxiliary piece 320 and the main piece 310 are engaged.

In this case, like the above described embodiment, the auxiliary piece 320 comprises a fixing groove, and the bonding member 150 is fixedly inserted in the fixing groove with part of the bonding member 150 exposing to the outside.

In addition, the auxiliary piece 320 comprises an auxiliary long groove 325 corresponding to the main long groove 315 of the main piece 310, and the main piece 310 and the auxiliary piece 320 come to be engaged as the main long groove 315 of the main piece 310 and the auxiliary long groove 325 of the auxiliary piece 320 slide crossing to each other.

In addition, it is preferred that the bonding member 150 is inclined for the auxiliary piece 320 to slide and easily insert in the main long groove 315 of the main piece 310.

The assembly type furniture equipped with a press type bonding member according to the present invention has features in that a preparation for the sake of an assembly between pieces can be completed by installing the bonding member in the fixing groove in a simple way, so the whole manufacture process becomes simple. Since the shape fixing grooves and bonding members are provided in all pieces, they are all compatible, which results in easier manufacture and assembly.

Less manufacture costs are required thanks to simplified assembling processes, and since the same type of bonding members are adapted to around the long grooves of various types of pieces, the manufacture cost can be saved.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims; and therefore all changes and modifications that fall within the meets and bounds of the claims, or equivalences of such meets and bounds are therefore intended to be embraced by the appended claims.

The invention claimed is:

1. An assembly type furniture equipped with a press type bonding member, comprising:

a main piece which includes a main long groove for engagement at a circumference of at least one side;

an auxiliary piece which slides in the main long groove of the main piece;

a bonding member which is provided in the auxiliary piece at a position pressing one side of the main long groove when one side of the auxiliary piece slides along the main long groove of the main piece, by which to maintain an engaged state of the main piece and the auxiliary piece in a state that one side of the auxiliary piece and one side of the main long groove of the main piece are pressed, and a third piece with a cross shaped groove which accommodates a crossed portion in which a protrusion of the main piece and a long piece reside as the auxiliary piece and the main piece are engaged, wherein the auxiliary piece comprises an auxiliary long groove corresponding to the main long groove of the main piece, and at the other side of the auxiliary long groove is provided a protrusion of the main piece, and at both sides of the auxiliary long groove of the auxiliary piece is provided the long piece which comes to have the same height as that of the protrusion after the auxiliary piece is engaged with the main piece, wherein the auxiliary piece comprises a fixing groove, and the bonding member is fixedly inserted in the fixing groove and partly exposed to an outside of the auxiliary piece at a position pressing one side of the main long groove.

2. The furniture of claim 1, wherein the main long groove of the main piece and the auxiliary long groove of the auxiliary piece slide crossing to each other, so the main piece and the auxiliary piece are engaged.

3. The furniture of claim 1, wherein the bonding member is inclined for the auxiliary piece to slide and insert in the main long groove of the main piece.

* * * * *